United States Patent [19]

Williams

[11] 3,939,012
[45] Feb. 17, 1976

[54] MULTIPOINT THERMOCOUPLE ASSEMBLY USING COIL SPRINGS

[75] Inventor: Richard David Williams, Houston, Tex.

[73] Assignee: Instrumatics, Inc., Houston, Tex.

[22] Filed: Apr. 21, 1975

[21] Appl. No.: 569,818

[52] U.S. Cl. .................. 136/221; 73/341; 73/349; 136/230; 136/232
[51] Int. Cl.² . G01K 1/08; G01K 7/04; H01L 35/02
[58] Field of Search .................. 73/339 R, 340–342, 73/349, 359, 295; 136/221, 230, 232, 233

[56] References Cited
UNITED STATES PATENTS

| | | | |
|---|---|---|---|
| 2,520,494 | 8/1950 | Dalin | 73/341 X |
| 2,676,489 | 4/1954 | Basham | 73/342 |
| 3,015,234 | 1/1962 | Springfield | 73/359 X |
| 3,263,502 | 8/1966 | Springfield | 136/221 |
| 3,280,627 | 10/1966 | Cousins et al. | 73/295 |
| 3,637,438 | 1/1972 | Springfield | 136/230 |

*Primary Examiner*—Jerry W. Myracle
*Assistant Examiner*—Frederick Shoon
*Attorney, Agent, or Firm*—Fulbright & Jaworski

[57] ABSTRACT

A multipoint thermocouple assembly using coil springs in which a coil spring is used with each thermocouple to maintain contact between the thermocouple measuring junction and the interior side of the assembly housing. Maintenance of such contact helps to insure an accurate reading of temperature changes which occur outside the assembly housing.

6 Claims, 4 Drawing Figures

U.S. Patent  Feb. 17, 1976  3,939,012
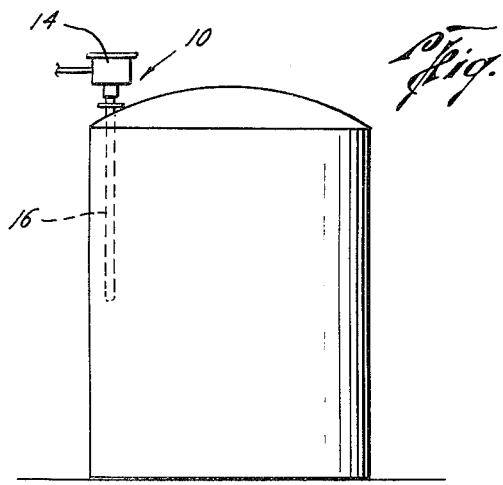
Fig. 1
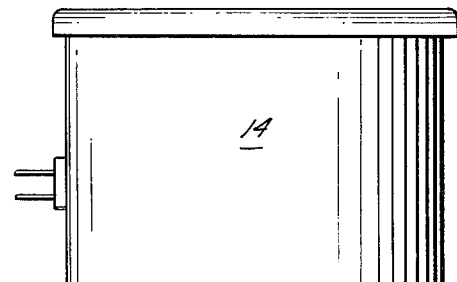
Fig. 2
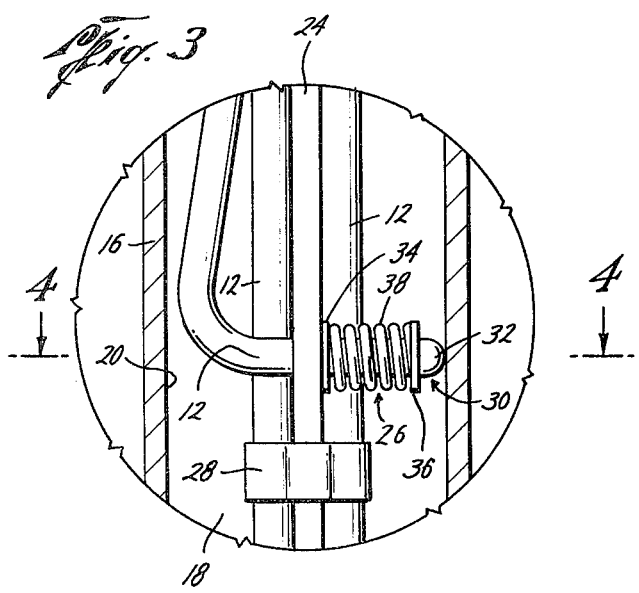
Fig. 3
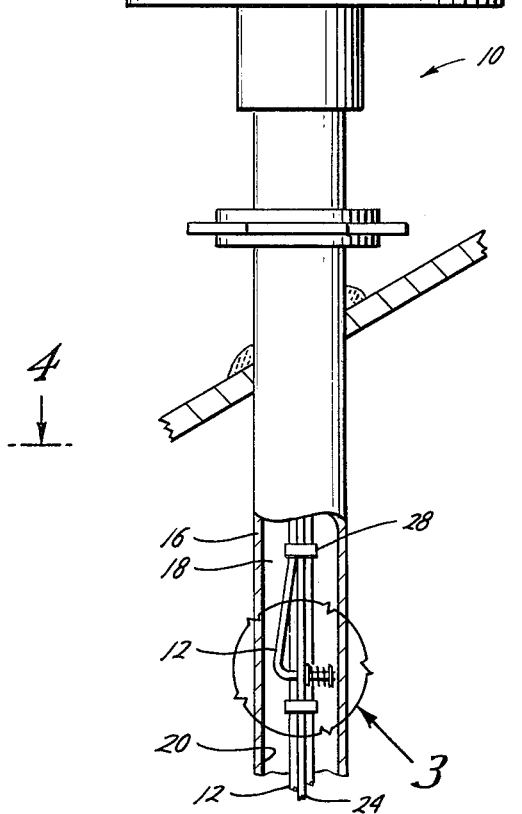
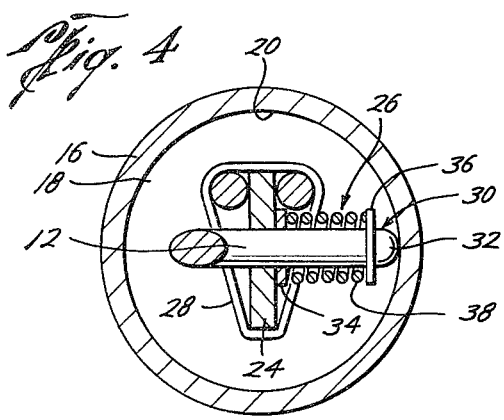
Fig. 4

MULTIPOINT THERMOCOUPLE ASSEMBLY USING COIL SPRINGS

BACKGROUND OF THE INVENTION

In various processes, it may be necessary or desirable to obtain a temperature profile throughout a vessel. Because of space limitation or cost, it may be impractical to insert individual thermocouples through numerous openings in the vessel to obtain such profile. Therefore, a variety of multipoint thermocouple assembly designs, each of which can be inserted through a single opening in the vessel, have been offered to the public. A protection well (assembly or exterior housing) containing several thermocouples is generally used.

Ideally, the hot (measuring) junction of each thermocouple is in direct contact with the inside wall of the exterior housing for fast response to temperature changes in the process. One method of maintaining this direct contact has involved the use of springs. To the best of Applicant's knowledge, the previous spring methods have included a leaf spring or bimetallic spring, the use of the latter spring being claimed in U.S. Pat. No. 3,015,234. Applicant is unaware of any prior use of coil springs for maintaining the contact between the hot junctions of the thermocouples and the inside wall of the exterior housing.

Applicant presently is aware of the following patent in the field of the art: U.S. Pat. No. 3,015,234 (Springfield, 1962). Applicant also is aware of its own multipoint thermocouple assemblies including the leaf spring design which is shown in Assembly Type II of the enclosed paper.

SUMMARY OF THE INVENTION

The apparatus of the present invention generally provides a suitable method for holding the hot junctions of the various thermocouples against the inner wall of the multipoint thermocouple assembly's exterior housing. The coil spring configuration of the present invention replaces leaf spring or bimetallic spring configurations and, because of space limitations, offers greater spring force. Such space limitations also result in the coil spring having a longer spring travel than the other configurations. Because the end of each thermocouple is bent at a right angle to the exterior housing, the coil spring provides a force which maintains the hot junction of the thermocouple in contact with the interior wall of the exterior housing even though said housing may move and flex in service.

Although the leaf spring and bimetallic spring designs attempt to solve the same problem as the present invention, such designs fail to offer the greater spring force which the present invention can obtain or its greater spring travel.

It is, therefore, an object of the present invention to provide a multipoint thermocouple assembly using coil spring to maintain the hot junctions of the thermocouples in contact with the housing.

Another object of the present invention is the provision of greater spring force which can be obtained with a coil spring.

Still another object of the present invention is the provision of greater spring travel, which is obtained from a coil spring and which allows the thermocouple's hot junction to remain in contact with the inner wall of the exterior housing even though said housing may move occasionally.

A further object of the present invention is the provision of thermocouples whose ends containing the hot junctions are bent at right angles to the exterior housing, thereby centering each thermocouple's hot junction and support mechanisms with the wall of the exterior housing.

Still other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

In the drawings forming a part of the disclosure herein, like character references designate like parts throughout the several views, wherein FIG. 1 is a side elevational view of a multipoint thermocouple assembly as used in a storage vessel;

FIG. 2 is a side elevational view, partly in section, of a multipoint thermocouple assembly using coil springs;

FIG. 3 is a partial cut-away view of FIG. 2 showing an end section of one thermocouple and its associated parts; and FIG. 4 is a cross-sectional view of FIG. 3 taken along line 4—4.

DESCRIPTION OF THE PREFERRED EMBODIMENT

The multipoint thermocouple assembly 10 includes one or more thermocouples 12, an enclosure 14 for holding the cold junctions of the thermocouples, and an exterior housing 16 which contains a longitudinal passage 18 in which the interior portions of the assembly are maintained. Without limiting the design of the exterior housing, it should be noted that such housing may have a cylindrical shape.

The interior portions of the assembly 10 include the thermocouples 12, a support strap 24 passing through the longitudinal passage 18, and a coil spring means 26 for each thermocouple. While it may be possible to use other types of thermocouples in the present configuration, the preferred embodiment uses sheathed thermocouples. Each coil spring means 26 is located adjacent to and on the exterior side of a thermocouple 12 between the above mentioned support strap 24 and the interior side 20 of the exterior housing.

Each thermocouple 12 extends from the enclosure 14 which holds the cold junctions through the longitudinal passage 18 of the exterior housing 16. Initially, the path of the thermocouple is basically parallel to the center of such passage and the thermocouple is held in place adjacent to the support strap 24 by appropriate means 28. As shown in FIGS. 2–4, the means 28 is composed of various straps. However, the thermocouple departs from such path and curves outward toward the interior wall 20 of the exterior housing 16 as it approaches its end 30 which is located away from the enclosure 14. The thermocouple 12 terminates in a position which is basically perpendicular to its original path and which is immediately adjacent to and in contact with the interior wall 20 of the exterior housing 16. The hot junction 32 of the thermocouple 12 is located at such point. By positioning the hot junction 32 in direct contact with such interior wall 20, the thermocouple 12 responds quickly to any change in the temperature of the process in question.

The support strap 24 passes through the longitudinal passage 18 of the exterior housing 16 and may be fixedly attached to such housing by any conventional methods. However, the preferred method involves selection of a support strap which has a width approximately equal to the interior diameter of the exterior housing, assuming the latter is cylindrical. After a thermocouple 12 has had its direction changed and is directed towards the interior wall of the exterior housing, it passes through the support strap and then through a coil spring means 26. In the preferred embodiment, the coil spring means includes two stops 34 and 36 and a coil spring 38. One stop 34 is located adjacent to the support strap on the side of said strap which is nearest to the point of contact of the thermocouple 12 and the interior wall of the exterior housing. The other stop 36 is fixedly attached to the thermocouple at a point between the first stop 34 and the interior wall of the exterior housing. The coil spring 38 is located on the thermocouple 12 and between the first and second stops. Such positioning of the coil spring means 26 allows the coil spring to push the thermocouple 12 towards the interior wall of the exterior housing and hold the same in contact with said wall. The positioning of the thermocouple's hot junction 32 at the end of the thermocouple which is in contact with the interior wall of the exterior housing allows for fast response to temperature changes in the process which is located outside the exterior housing.

Included among the advantages of the present invention is the fact that greater spring force can be obtained, for the present purpose, with a coil spring than with a leaf or bimetallic spring. Therefore, the force which holds the thermocouple's hot junction in contact with the inner wall of the exterior housing is greater. Additionally, the space limitations result in the coil spring configuration having greater travel than other types of spring configuration. Finally, because the end of each thermocouple is bent at a right angle to the exterior housing, the coil spring provides a force which maintains the hot junction of the thermocouple in contact with the interior wall of the exterior housing even though said housing may move or flex occasionally.

The present invention, therefore, is well adapted to carry out the objects and attain the ends and advantages mentioned as well as others therein. While a presently preferred embodiment of the invention has been given for the purpose of disclosure, numerous changes may be made without departing from the spirit and scope of the invention as hereinafter claimed.

What is claimed is:

1. In a thermocouple assembly for obtaining a temperature profile of a process throughout a vessel, which assembly includes a thermocouple having a cold junction and a temperature sensitive end, an enclosure containing said cold junction, a housing extending from the enclosure containing a longitudinal passage therein, the thermocouple being located in the longitudinal passage and extending generally parallel thereto throughout most of its length, the improvement comprising:
   a. the temperature sensitive end of the thermocouple extending generally perpendicular to the longitudinal passage and being in contact with the interior of the housing;
   b. a support strap located in said longitudinal passage and through which the temperature sensitive end of the thermocouple extends; and
   c. coil spring means operatively connected to the temperature sensitive end for maintaining said temperature sensitive end in contact with the interior of said housing.

2. The invention of claim 1 wherein said coil spring means (c) is further defined as being superimposed over the temperature sensitive end of the thermocouple and being in contact with said support strap (b) for urging said temperature sensitive end away from said support strap and into contact with the interior of said housing.

3. The invention of claim 1 wherein the thermocouple assembly includes a plurality of said thermocouples having cold junctions and temperature sensitive ends, wherein the temperature sensitive end of each thermocouple extends generally perpendicular to the longitudinal passage and is in contact with the interior of the housing and coil spring means exist for each thermocouple, each coil spring means being operatively connected to its respective thermocouple for maintaining the temperature sensitive end in contact with the interior of said housing.

4. In a thermocouple assembly for obtaining a temperature profile of a process throughout a vessel, the combination including:
   a. a thermocouple having a cold junction and a temperature sensitive end;
   b. an enclosure containing said cold junction;
   c. a housing extending from the enclosure and containing a longitudinal passage therein, the thermocouple being located in the longitudinal passage and extending generally parallel thereto throughout most of its length, while the temperature sensitive end of the thermocouple extends generally perpendicularly to the longitudinal passage and is in contact with the interior of the housing;
   d. a support strap located in said longitudinal passage and through which the temperature sensitive end of the thermocouple extends; and
   e. coil spring means operatively connected to the temperature sensitive end for maintaining said temperature sensitive end in contact with the interior of said housing.

5. The invention of claim 4 wherein said coil spring means (e) is further defined as being superimposed over the temperature sensitive end of the thermocouple (a) and being in contact with said support strap (d) for urging said temperature sensitive end away from said support strap and into contact with the interior of said housing (c).

6. The invention of claim 4 wherein the thermocouple assembly includes a plurality of said thermocouples (a) having cold junctions and temperature sensitive ends, wherein the enclosure (b) contains all said cold junctions and the housing (c) contains all of the thermocouples with the temperature sensitive ends extending generally perpendicular to the longitudinal passage and being in contact with the interior of the housing, and coil spring means exist for each thermocouple, each with spring means being operatively connected to its respective thermocouple for maintaining the temperature sensitive end in contact with the interior of said housing (c).

* * * * *